United States Patent
Blando (10) Patent No.: US 6,185,583 B1
(45) Date of Patent: Feb. 6, 2001

(54) PARALLEL RULE-BASED PROCESSING OF FORMS

(75) Inventor: Luis R. Blando, Shrewsbury, MA (US)

(73) Assignee: GTE Laboratories Incorporated, Waltman, MA (US)

(*) Notice: Under 35 U.S.C. 154(b), the term of this patent shall be extended for 0 days.

(21) Appl. No.: 09/201,135

(22) Filed: Nov. 30, 1998

(51) Int. Cl.[7] ........................................ G06F 17/30
(52) U.S. Cl. ................ 707/507; 707/506; 707/505; 345/333
(58) Field of Search .................. 707/504, 505, 707/707; 345/333

(56) References Cited

U.S. PATENT DOCUMENTS

| | | | |
|---|---|---|---|
| 3,974,496 | * 8/1976 | Aptroot-Soloway | 707/507 |
| 5,546,574 | * 8/1996 | Grosskopf et al. | 707/201 |
| 5,704,029 | * 12/1997 | Wright, Jr. | 707/504 |
| 5,758,126 | * 5/1998 | Daniels et al. | 345/333 |
| 5,920,857 | * 7/1999 | Rishe et al. | 707/3 |

OTHER PUBLICATIONS

Forgy, Charles L. "Rete: A Fast Algorithm for the Many Pattern/ Many Object Pattern Match Problem" Artificial Intelligence, vol. 19, pp. 17–32, 1982.

* cited by examiner

Primary Examiner—Paul R. Lintz
(74) Attorney, Agent, or Firm—Leonard Charles Suchyta (57) ABSTRACT

System and method for verifying data in forms. Each form has a corresponding one or more rule sets each with rules that designate a structure, format, or data type for fields in the form. The rule sets are verified in parallel. Rules within a rule set may also be verified in parallel when the processor determines it is beneficial such as for time consuming rule validation.

16 Claims, 7 Drawing Sheets

| Order | |
|---|---|
| Name | Tom | ~210
| Address | Arlington, Virginia | ~220
| Class | X  Business<br><br>Residential | ~230
| Due Date | 1-1-99 | ~240
| Schedule | X  AM<br><br>PM | ~250
| Service | X  New Service<br><br>Change Service | ~260

PARALLEL RULE-BASED PROCESSING OF FORMS

BACKGROUND OF THE INVENTION

1. Field of the Invention

The present invention relates to systems for validating forms and more particularly, to a system and method that validates forms using rules to check data provided on the forms.

2. Discussion of the Related Art

Many businesses process forms to gather information about customers or sales. Each form typically includes multiple data fields. The data is reviewed either manually or by a computerized system. Additional examination may also be performed to confirm that the type of data entered into the fields is correct. For example, a date field should contain an alphanumeric string, while a name field should include only an alphabetic string.

Traditionally, forms are examined using validation statements that are included in the base application program that processes the forms and written in the same language as the application program, for example C or COBOL. All form examinations are included in this base application program. Therefore, when any form examination is added, the base application program must be rewritten, recompiled, and retested. A programmer must enter all rule changes. Therefore, it is desirable to have a system that stores rules separate from the base application program so that a more simple rule language may be used by a non-programmer.

Many current rule systems use a standard Rete algorithm that is not fit to validate rules in parallel due to inherent architecture and processing limitations. The Rete algorithm is described in "Rete: A Fast Algorithm for the Many Pattern/Many Object Pattern Match Problem", Artificial Intelligence, Vol. 19, pp 17–37, 1982. Using the Rete algorithm current rule systems perform rule checks on a form serially and do not verify more than one rule at a time or more than one rule set at a time, Accordingly, it is desirable to have a system that validates a form using more than one rule in parallel.

SUMMARY OF THE INVENTION

Systems and methods consistent with the principles of the present invention receive forms for validation. A memory stores program instructions performed by a processor to validate the forms. The processor operates responsive to the program instructions to receive a form and select rules that are associated with the form. The processor determines whether the form meets the requirements of each rule associated with the form, wherein at least two of the rules are validated in parallel.

In one embodiment, each form has associated rule sets where each rule set has a plurality of rules. The processor validates rules in each rule set in parallel. The processor may also process rules within a single rule set in parallel when, for example, the validation of a rule is expected to be time consuming. In this case, a separate thread is generated to check the time consuming rule.

BRIEF DESCRIPTION OF THE DRAWINGS

The accompanying drawings, which are incorporated in and constitute a part of this specification illustrate an embodiment of the invention and, together with the description, explain the objects, advantages and principals of the invention.

In the drawings.

DETAILED DESCRIPTION

The following detailed description of the invention refers to the accompanying drawings.

The same reference numbers in different drawings identify the same or similar elements. Also, the following detailed description does not limit the invention. Instead, the scope of the invention is defined by the appended claims and equivalents.

Methods and systems consistent with the present invention automatically examine received forms using rule sets associated with different forms. A form may represent, for example, an order for a service such as a telecommunications service and may arrive at an order validation system configured in accordance with the principles of the present invention via facsimile, electronic mail, or other transmission mode or facility. When a form is received, the system validates the form by making sure it complies with standards and specific validation rules. Each portion of the order has an associated rule set that includes a plurality of rules with which the form data must comply to be valid. In general, the system examines each form for compliance with syntactic, semantic, and domain requirements. Each of these types is described below.

Figure 1:
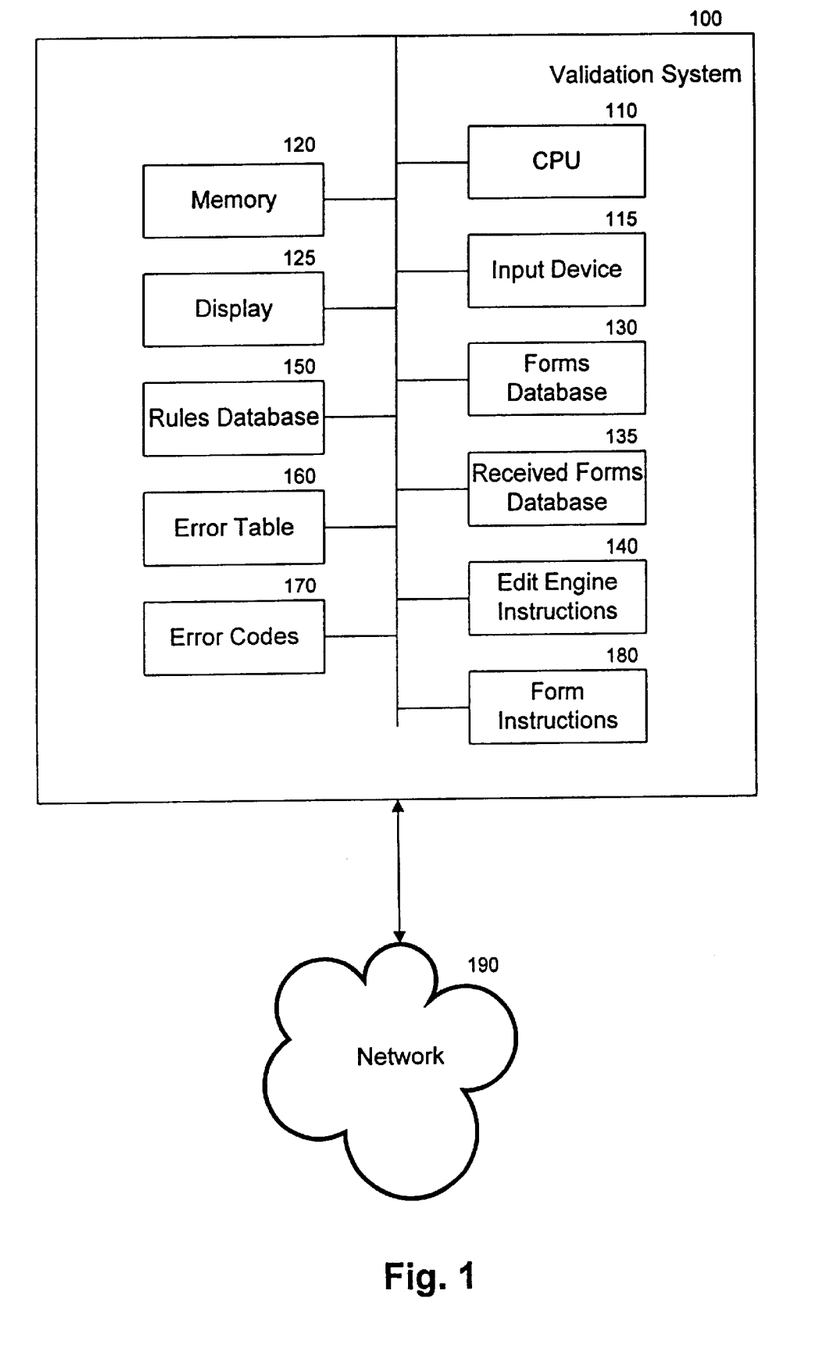
FIG. 1 is a block diagram of the overall validation system consistent with the present invention.

FIG. 1 shows a validation system 100 having a central processing unit (CPU) 110, an input device 115, a memory 120, a display 125, a forms database 130, received forms database 135, edit engine instructions 140, rules database 150, error table 160, error codes 170, and form instructions 180. Forms enter into the validation system 100 through network 190. Forms database 130 holds predefined forms along with field identifiers. Field identifiers represent data fields in the forms, such as a name field or an address field. Each form type has associated rules that dictate the type of data and placement of data in the fields. Rules database 150 holds rule objects where each rule object holds instructions for verifying various requirements in forms. Edit engine instructions 140 are instructions to be carried out by the CPU 110 to validate received forms. Error table 160 stores information to generate errors and stores lists of generated errors for output to a user at display 125.

Figure 2:
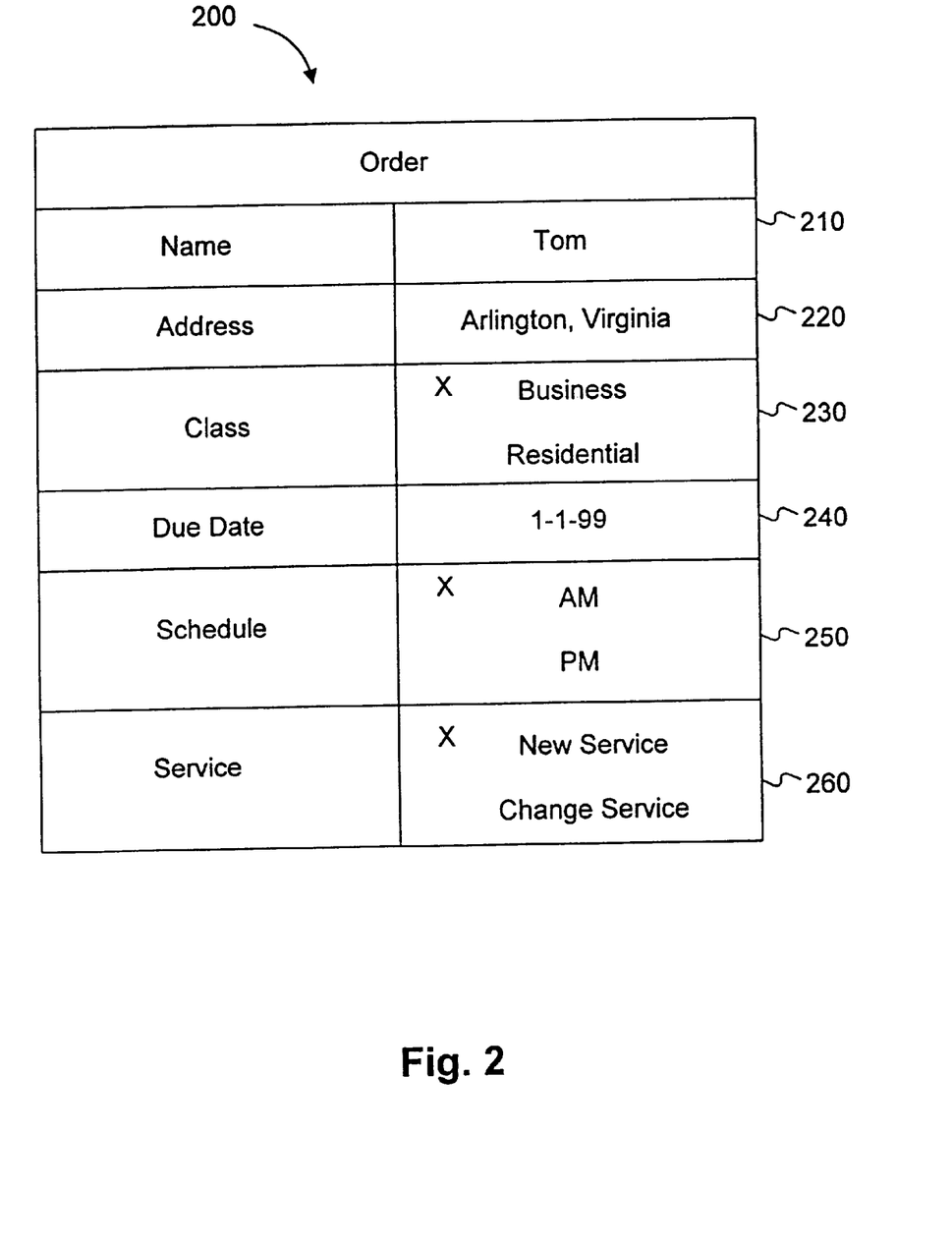
FIG. 2 is an example form from the point of view of a user.

FIG. 2 illustrates an example form 200, which in this case represents an order for a delivery, although other types of forms may be used without departing from the scope of the invention. Form 200 includes a name field 210, an address field 220, a class field 230, a due date 240, a schedule time 250, and a type of service 260. Data is entered into the example form 200 and sent to the validation system 100.

Figure 3:
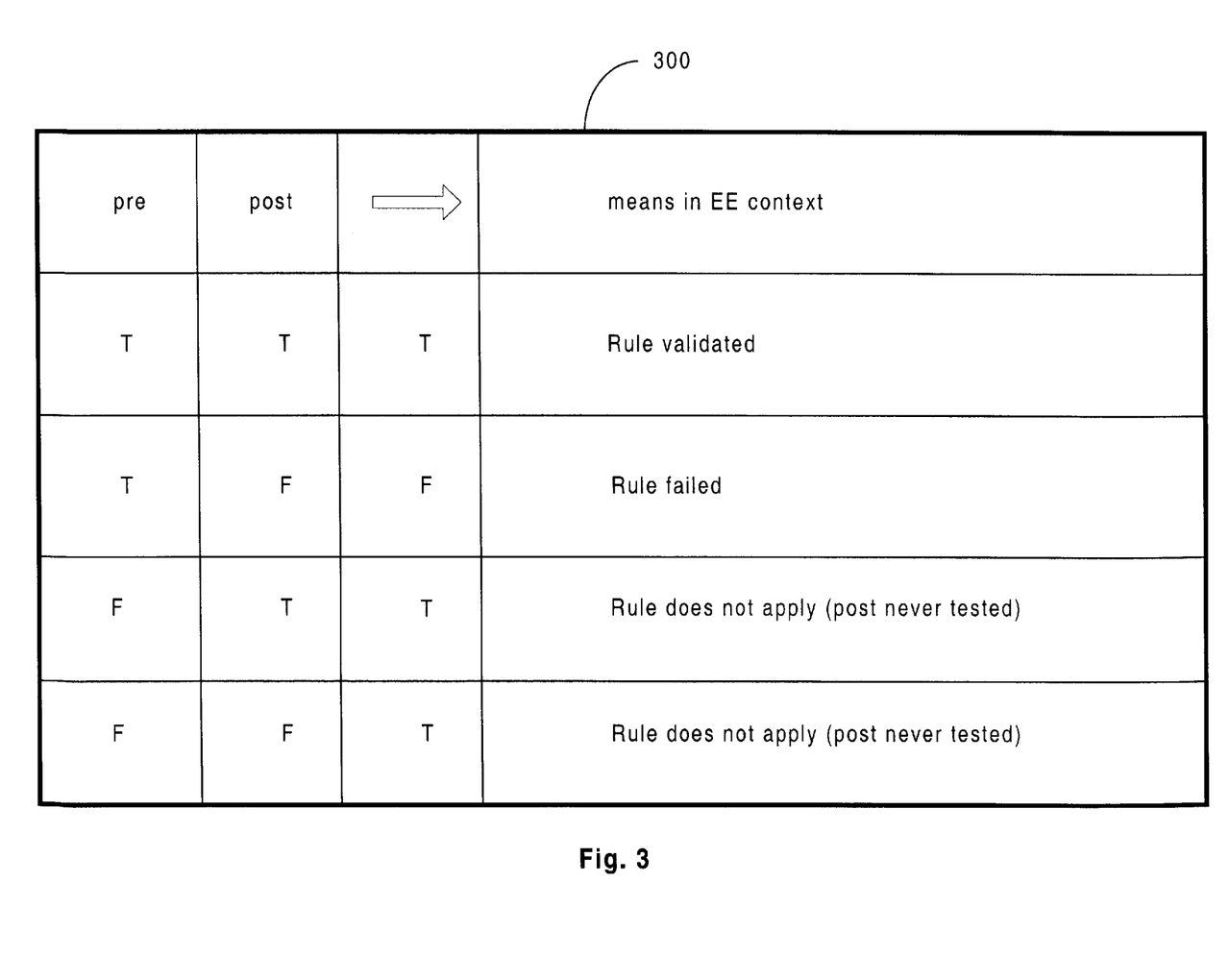
FIG. 3 is an example rule truth table chart.

In one embodiment, the type of rules used to process forms in a manner consistent with the present invention are precondition-post condition rules expressed as follows: if (pre-cond) is true then if (post-cond) is true then rule is true, if (pre-cond) is false then rule is true, and if (pre-cond) is true then if (post-cond) is false then rule is false. The truth table 300 corresponding to this expression is shown in FIG. 3. First, the pre-condition is checked for the field designated in the rule and, if true, the post-condition is checked and the result of True or False returned. For example, a rule may state that when a character in a type field is "A" then a year in a date field must be "98." The validation system 100 will check whether an "A" is in the type field, and if so will check that the date field is "98." If "A" is not in the type field or if there is an "A" and a "98" in the date field, then no error is generated. If there is an "A" in the type field and "98" is not in the date field an error message is generated.

Figure 4A:
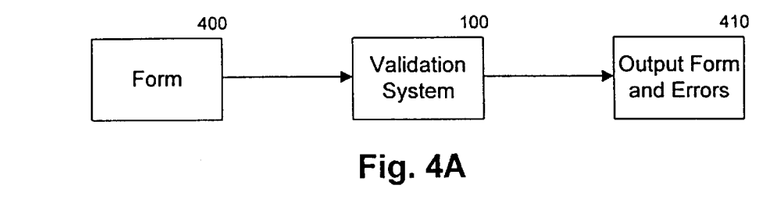
FIG. 4A is a block diagram of the overall flow of the validation system.
Figure 4B:
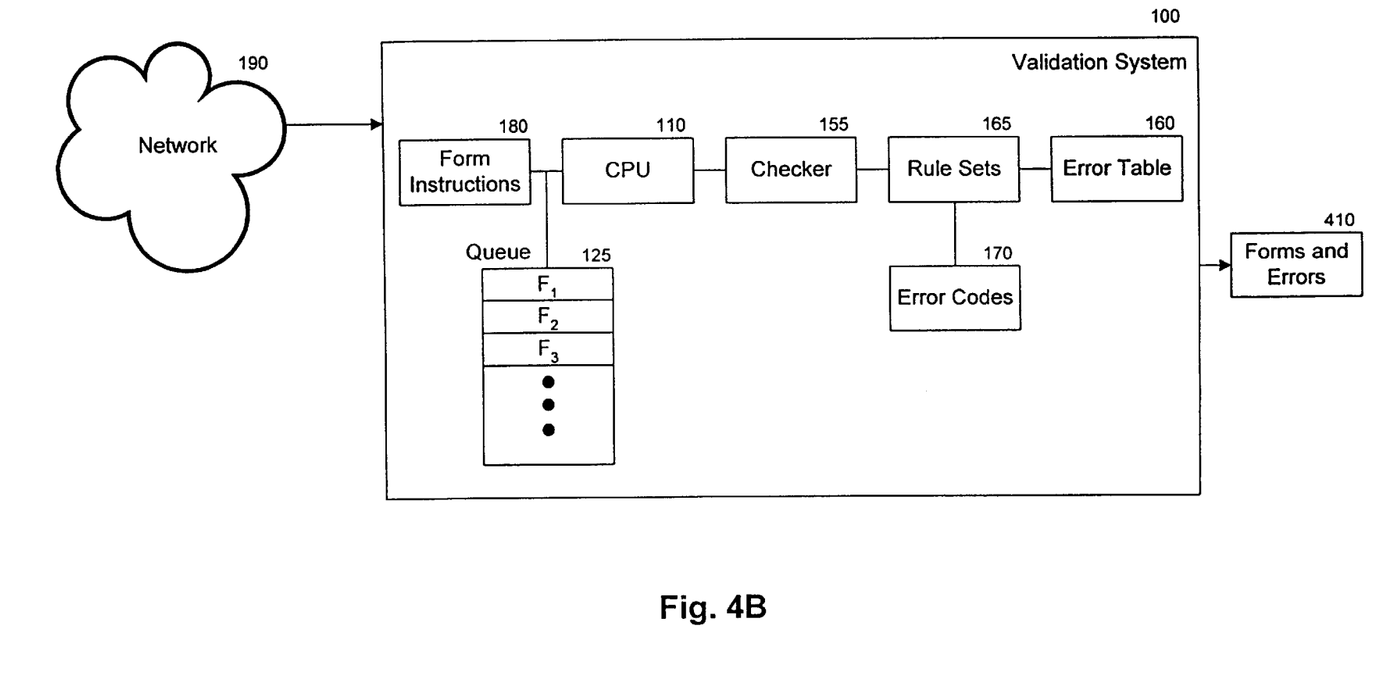
FIG. 4B is a block diagram of the validation engine.

FIG. 4A is an overall block diagram of the flow of forms in the present invention. Form 400 is input to validation system 100 which processes the form and outputs the form and any errors. FIG. 4B is a block diagram showing modules associated with the validity system 100 in FIG. 1 and the general processing flow between several of the modules.

Form 400 is input from network 190 to validation system 100. CPU 110, using form instructions 180, parses the form and inserts each field into queue 125. CPU 110 using the edit engine instructions 140 retrieves each field from the queue 125 for processing. Checker 155 represents a program module stored as instructions in the edit engine instructions 140 that is carried out by CPU 110.

Checker 155 uses one of the rule sets stored in rule sets 165 to process the form fields 125. Each rule set includes one or more rules. Rule sets 165 include code for processing fields in form 400 to confirm accuracy of the associated field data. The results of carrying out the rules in rule sets 165 is the generation of errors, if there are any, using error codes 170 which store the information needed to generate an error such as an error code and text. The resulting generated errors are stored in error table 160 and the forms and errors are output 410.

Each rule set in rule sets 165 is a thread. A thread is a part of a program that can execute independently of other parts of the program. By using threads, operating systems that support multithreading allow for threads to execute concurrently. The present invention allows for validating rules in parallel by using multithreading. Rules in rule sets 165 may either be programs that are called by a checker 155 or may be independent threads which are created when the rule set is called by the checker 155 and is extinguished after completion. Rules return error information to the checker 155.

Although FIG. 4B shows only one checker module 155, a validation system 100 can include more than one checker where the incoming form includes an identifier that identifies the appropriate checker to use to evaluate that form. For example different versions of the form may require using different checkers.

Figure 5:
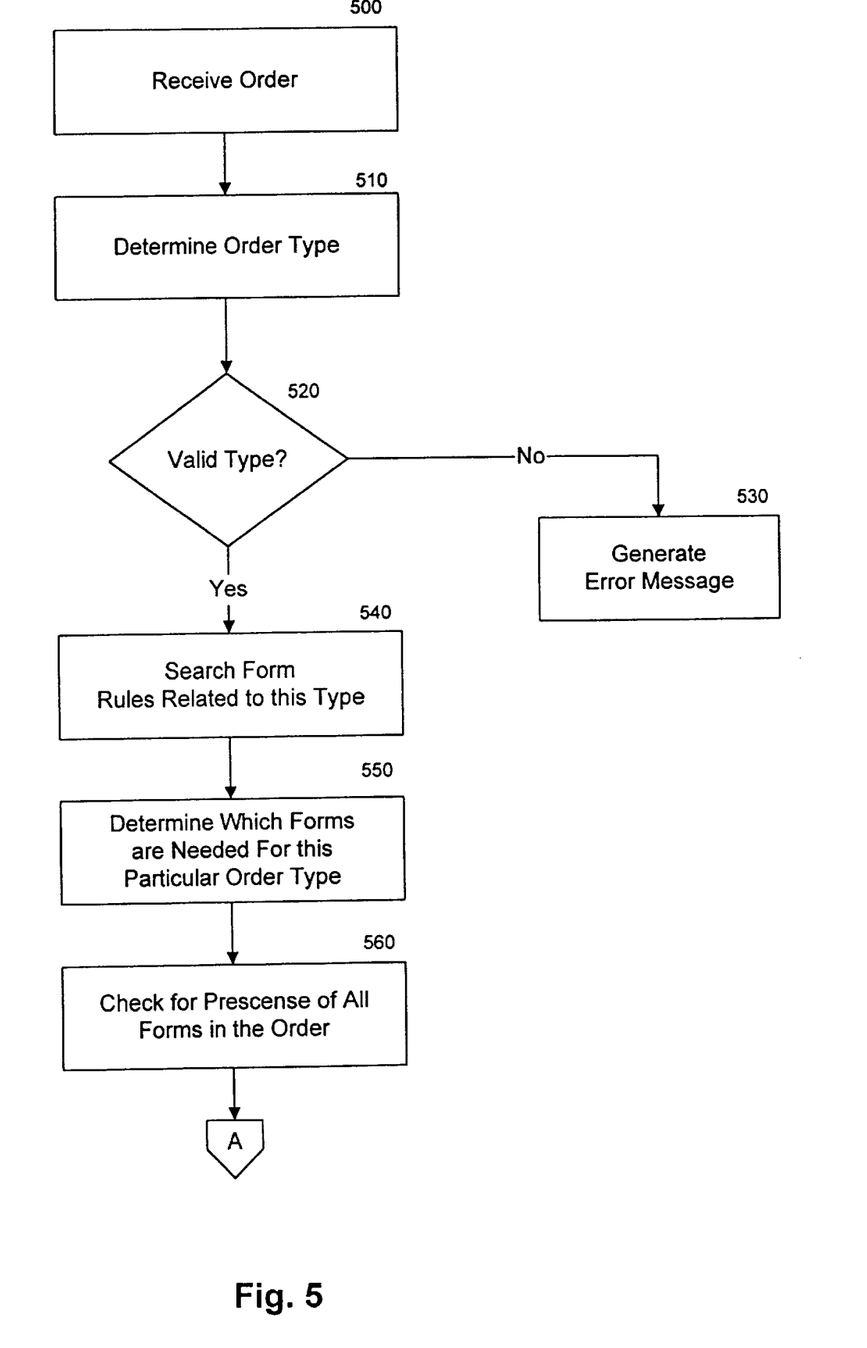
FIG. 5 is a flow chart showing steps for processing a received order and comparing the order to expected order types.
Figure 6A:
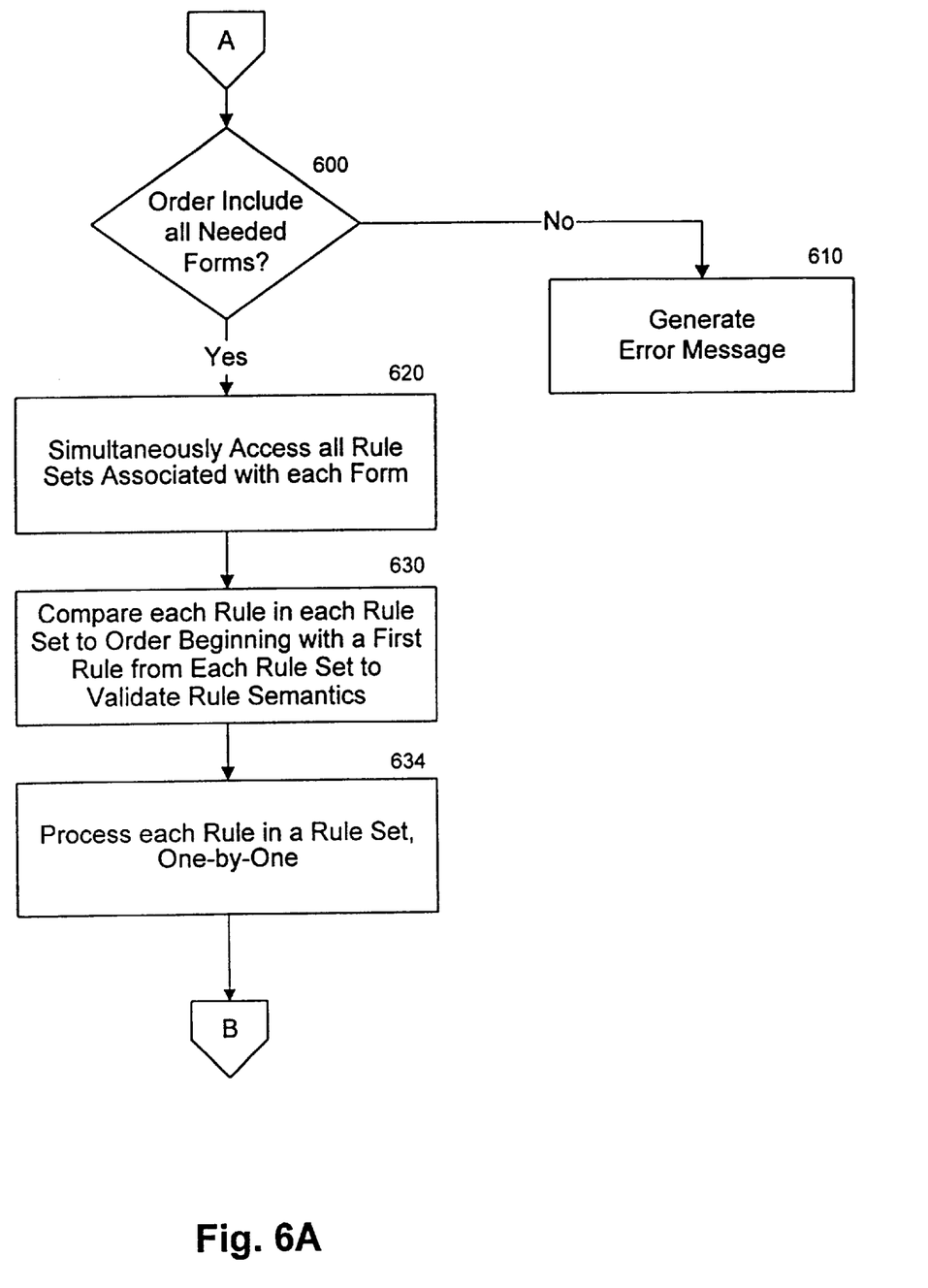
FIG. 6A is a flow chart showing the steps for processing an order and comparing the order to rules associated with a determined order type.
Figure 6B:
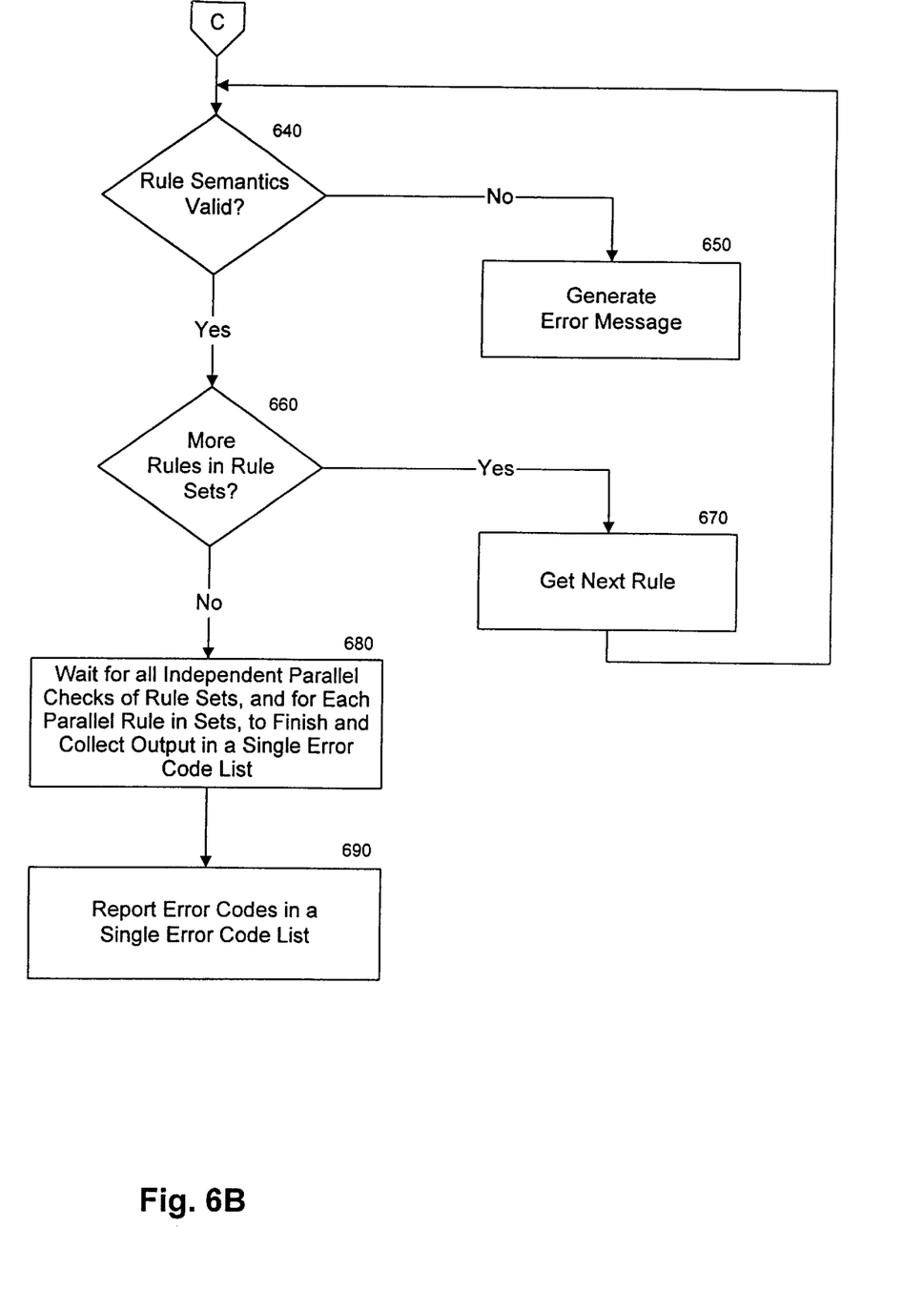
FIG. 6B is a flow chart that continues the steps from FIG. 6A to process an order and compare the order to rules in parallel.

FIGS. 5 and 6 show the steps for validating an order having more than one form received from display 125. First, an order is received at the validation system 100 and stored in received forms database 135 (step 500). CPU 110 determines a type of the order received by comparing a request type field and activity code field included in the form to valid types of orders in rules database 150 (step 510). CPU 110 determines whether the received order type is valid (step 520) and if not, an error message is generated (step 530).

Otherwise, CPU 110 searches rules database 150 for all rules related to this order type (step 540). Rules database 150 includes rules that specify the forms that must be present with any specified type of request. CPU 110 determines, from the found rules, which forms correspond to this particular order type based on the information stored in rules database 150 (step 550). CPU 110 checks the received order for the presence of all forms corresponding to the order type (step 560).

As shown in FIG. 6A, if CPU 110 determines that all corresponding forms are not included in the order (step 600), then CPU 110 generates an appropriate error message in accordance with error tables 170 (step 610). Otherwise, if all corresponding forms are included in the order (step 600), CPU 110 simultaneously accesses the rule sets associated with each form in rules database 150 (step 620). In parallel, CPU 110 compares each rule in each rule set to the received order, beginning with the first rule from each rule set, to validate the rule requirements (step 630). Not only are the rule sets executed in parallel but rules within a rule set may be executed in parallel at the direction of the edit engine instructions 140. CPU 110 processes each rule in a particular rule set one-by-one (step 634). As shown in FIG. 6B, if CPU 110 determines that a particular rule will take a lot of time, such as an external rule (step 636), then the CPU 110 will generate an independent thread to process that rule (step 638). CPU 110 will continue to process other rules in a current rule set in parallel with the independent threads. After generating the thread, or determining that a rule is not time consuming, CPU 110 determines whether the rules are followed for each rule by seeing whether any of the rule requirements are violated (step 640). If a rule is violated, then CPU 110 generates an error message using the errors in error table 160 and stores the same in a section of error tables 170 (step 650). CPU 110 determines whether there are any more rules in the rule sets to be evaluated (step 660), and if so, the next rule in each rule set is read (step 670) and evaluated beginning with step 640. CPU 110 waits for all the checking of all rules in parallel and collects the output of each in a single error code list (step 680). CPU 110 saves the error codes in a single file in error tables 170 for sending to the display 125 (step 690). Each rule is tested before the error codes are output so that one complete report is received by a user at display 125.

Steps 630–640 carry out all validations required by the rules. There are many types of checks. One type of check is a syntactic check. Syntactic checks are performed at a field level using the field data in the forms. For example, if only numeric values are allowed in a certain field of the form, then the system checks whether the data in the field is numeric. Another type of check is semantic checks which confirm field dependencies. For instance, "if field1=A then field2 must be present" or "if ACT=2 then REFNUM should be 1, 2, or 3." Another type of check is a domain check that checks for errors that cannot be found just by looking at the form, but involve looking at outside data. For example, checking that the name entered in a customer field is a valid customer by searching a list of valid customers. In another embodiment, domain checks may be performed directly by the rules by providing code in the rules for requesting data from back end systems instead of requiring the validity system 100 to initiate the request while validating the rule.

In an alternative embodiment, the system may process local service orders (LSO) or local service requests (LSR) that include a plurality of forms. Each form in the order or request must be processed separately to determine if it is valid. In addition, the order or request may be examiner to ensure that all required forms are included.

The foregoing description of embodiments of the present invention provides illustration and description, but is not intended to be exhaustive or to limit the invention in the precise form disclosed. Modifications and variations are possible in light of the above teachings or may be acquired from practice of the invention. The scope of the invention is defined by the claims and their equivalents. Although systems and methods consistent with the present invention are described as using various known protocols, other protocols may exist or may be created that may also be used. Additionally, although other aspects of the present invention are described as being stored in the database, one of ordinary skill in the art will appreciate that this data may be stored in many different forms and on many different mediums including a memory, computer readable media, hard disk, floppy disk, or a compact disk reader.

What is claimed is:

1. A system for processing forms, comprising:
   a memory including program instructions; and
   a processor operating responsive to the program instructions to:
   receive a form;
   select rules associated with the form; and
   apply at least two rules to the form in parallel.

2. The system of claim 1 wherein the form has more than one associated rule set having a plurality of rules and the processor further operates responsive to the program instructions to:
   determine in parallel whether the form meets the requirements of a first rule in the more than one associated rule set, and
   determine in parallel whether the form meets the requirements of a second rule in the more than one associated rule sets.

3. The system of claim 1 wherein the processor further operates responsive to the rule instructions to:
   search an external system for information to validate data in a field of the form based on one of the rules.

4. The system according to claim 3 wherein the processor further operates responsive to the rule instructions to:
   generate a thread to carry out the search.

5. The system of claim 1 wherein each rule including a plurality of rule instructions in an independent module and the processor further operates responsive to the rule instructions to:
   determine a relationship between fields based on the rules;
   determine whether a relationship between fields requires data entry in a dependent field; and
   generate an error message when the dependent field does not contain data.

6. The system of claim 1 wherein each rule including a plurality of rule instructions in an independent module and the processor further operates responsive to the rule instructions to:
   compare a type of data in at least one field of the received form to a predetermined type of data for the field as designated by a rule; and
   generate an error message when the field types do not match.

7. The system of claim 1 wherein the processor further operates responsive to the program instructions to:
   receive an order including a plurality of forms;
   determine the forms that correspond to a type of the order; and
   determine whether all corresponding forms are present in the order.

8. The system of claim 7 wherein the processor further operates responsive to the program instructions to:
   generate an error message if each of the corresponding forms is not present in the order.

9. A method for processing forms, comprising the steps of:
   receiving a form;
   selecting rules associated with the form; and
   applying two rules to the form in parallel.

10. The method of claim 9 wherein the form has more than one associated rule set having a plurality of rules, said method further including the steps of:
    determining in parallel whether the form meets the requirements of a first rule in the more than one associated rule set, and
    determining in parallel whether the form meets the requirements of a second rule in the more than one associated rule sets.

11. The method of claim 9 further including the steps of:
    searching an external system for information to validate data in a field of the form based on one of the rules.

12. The method according to claim 11 further including the steps of:
    generating a thread to carry out the search.

13. The method of claim 9 wherein each rule including a plurality of rule instructions in an independent module, said method further including the steps of:
    determining a relationship between fields based on the rules;
    determining whether a relationship between fields requires data entry in a dependent field; and
    generating an error message when the dependent field does not contain data.

14. The method of claim 9 wherein each rule including a plurality of rule instructions in an independent module, said method further including the steps of:
    comparing a type of data in at least one field of the received form to a predetermined type of data for the field as designated by a rule; and
    generating an error message when the field types do not match.

15. The method of claim 9 further including the steps of:
    receiving an order including a plurality of forms;
    determining the forms that correspond to a type of the order; and
    determining whether all corresponding forms are present in the order.

16. The method of claim 15 further including the steps of:
    generating an error message if each of the corresponding forms is not present in the order.

* * * * *